(12) United States Patent
Zhou

(10) Patent No.: US 6,761,591 B1
(45) Date of Patent: Jul. 13, 2004

(54) SIM CARD RECEIVING MECHANISM

(75) Inventor: Hunter Zhou, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/383,941

(22) Filed: Mar. 7, 2003

(30) Foreign Application Priority Data

Dec. 31, 2002 (TW) ...................................... 91221584 U

(51) Int. Cl.[7] .......................................................... H01R 24/00
(52) U.S. Cl. .................................................................. 439/630
(58) Field of Search ................................ 439/630, 325, 439/326, 327, 328, 347

(56) References Cited

U.S. PATENT DOCUMENTS

| | | | |
|---|---|---|---|
| 5,613,866 A | * 3/1997 | Niimura | 439/260 |
| 5,816,838 A | * 10/1998 | Del Prete et al. | 439/326 |
| 6,175,505 B1 | * 1/2001 | Cheng et al. | 361/752 |
| 6,325,637 B1 | * 12/2001 | Barnett | 439/67 |

* cited by examiner

*Primary Examiner*—Ross Gushi
(74) *Attorney, Agent, or Firm*—Wei Te Chung

(57) ABSTRACT

A SIM card receiving mechanism for holding a SIM card (6) in an electronic device includes a first recess (4) and a securing assembly (2). An elastic element (41) is formed in the first recess. The securing assembly includes a second recess (7) and a slideable element (5). The second recess is in communication with the first recess. The slideable element is slideably received in the second recess. When the slideable element is moved toward the first recess, to a latched position, the slideable element can hold a SIM card down in the first recess. To remove the SIM card, the slideable element is moved away from the first recess and the elastic element pushes the SIM card upwardly and out of the first recess.

16 Claims, 3 Drawing Sheets

SIM CARD RECEIVING MECHANISM

BACKGROUND OF THE INVENTION

1. Field of the Invention

This invention generally relates to mechanisms for holding surface contact cards of electronic devices, and more particularly to a SIM card receiving mechanism for holding a SIM card in an electronic device.

2. Prior Art

Surface contact cards having special circuits are widely used in electronic devices to enhance or specialize the functions of the electronic devices.

For example, a subscriber identity module (SIM) card is placed in a portable phone to dedicate the phone's functions to the SIM card owner. By changing SIM cards, a single phone can be used by many SIM card owners as a personal phone.

A conventional mechanism for holding a SIM card includes a base made of insulating material and a cover pivotally attached to the base. The base is mounted on a printed circuit board (PCB) of a mobile phone and comprises a plurality of pin contacts. The cover is rotated upwardly to an open position, and the SIM card is inserted into receiving grooves which are provided on opposite sides of the cover. Then, the cover is rotated downwardly to the closed position so that the contact pads of the SIM card are brought into electrical contact with the pin contacts on the base.

In order to simplify a structure of a card connector and to provide a connector for situations where insufficient space is available to pivot a cover, U.S. Pat. No. 5,823,828 discloses an improved structure for holding a SIM card. The structure comprises a dielectric support that forms a card-holding recess and a cover that holds the card down against contacting ends of pin contacts mounted on the support. The cover can be slideable on the support. When the card is fully inserted into the recess, with a rear edge of the card abutting an inner rear wall of the support, the front edge of the card projects forward from a front end of the support so that the card can be readily pulled out of the support.

However, it may still be inconvenient to change the SIM card if the card-holding recess is very small, even though the front edge of the card projects forward from the front end of the support.

SUMMARY OF THE INVENTION

Accordingly, an object of the present invention is to provide a SIM card receiving mechanism for holding a SIM card in an electronic device, which renders the SIM card easy to change.

To achieve the above-mentioned object, a SIM card receiving mechanism for holding a SIM card in an electronic device includes a first recess and a securing assembly. An elastic element is formed to protrude in the first recess. The securing assembly includes a second recess and a slideable element. The second recess is in communication with the first recess. The slideable element is slideably received in the second recess. The slideable element is moved toward the first recess to hold the SIM card down in the first recess. To remove the SIM card, the slideable element is moved away from the first recess and the elastic element pushes the SIM card upwardly, causing it to protrude from the first recess. The SIM card receiving mechanism of the present invention makes it easier for a consumer to change a SIM card.

Other objects, advantages and novel features of the present invention will be drawn from the following detailed description of preferred embodiments of the present invention.

DETAILED DESCRIPTION OF THE INVENTION

Figure 1:
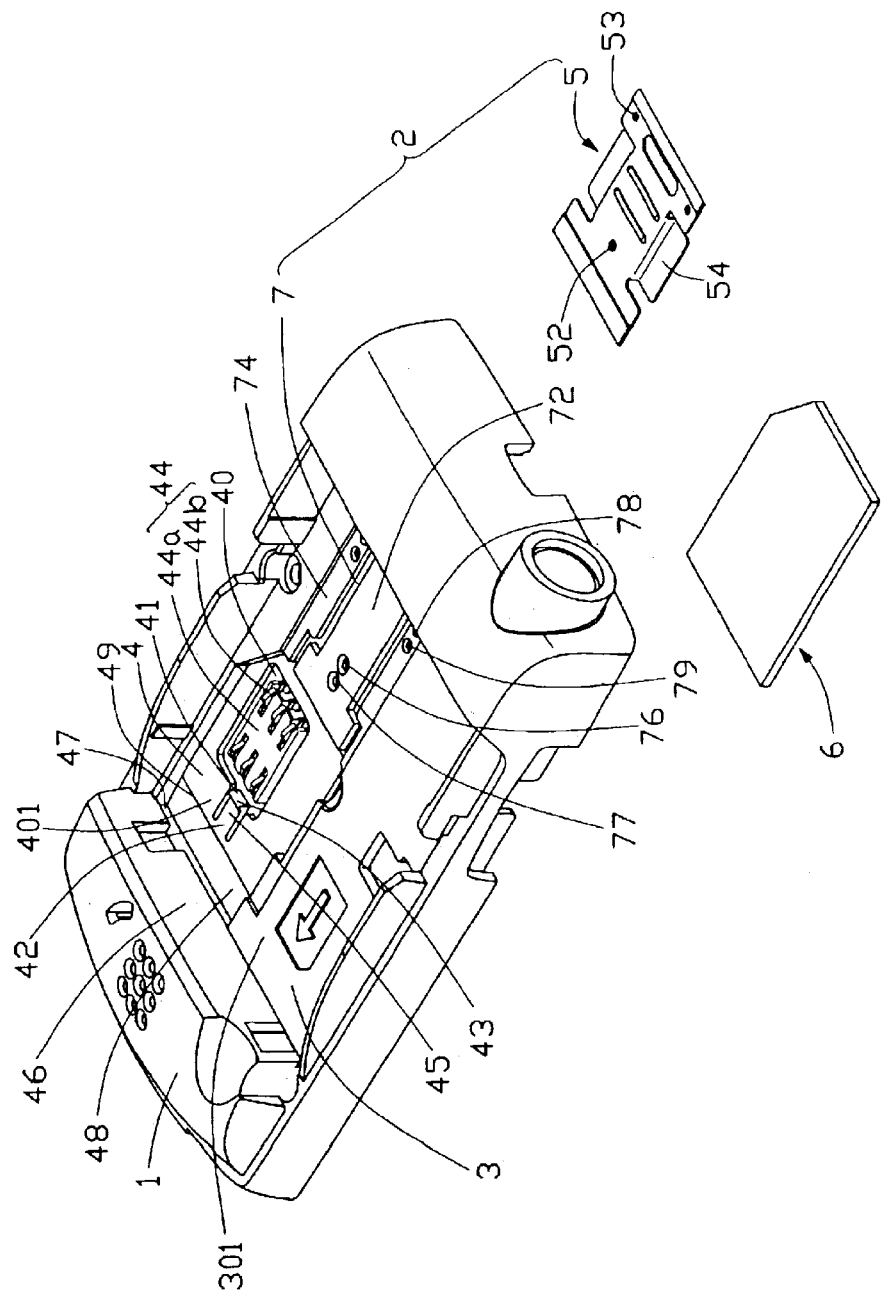
FIG. 1 is a perspective view of a bottom of an electronic device showing a SIM card and a disassembled SIM card receiving mechanism according to a preferred embodiment of the invention.

FIG. 1 shows a perspective view of a rear cover 1 of an electronic device (not shown) with a battery module (not shown) removed to expose a battery-receiving compartment 3, in which a SIM card receiving mechanism (not labeled) for holding a SIM card 6 is shown. The SIM card receiving mechanism according to a preferred embodiment of the present invention comprises a first recess 4 and a securing assembly 2. The first recess 4 is defined in a corner (not labeled) of a bottom surface 301 of the battery-receiving compartment 3. The securing assembly 2 comprises a second recess 7 and a slideable element 5. The second recess 7 is defined in a second corner of the bottom surface 301 of the battery-receiving compartment 3, and is in communication with the first recess 4. The slideable element 5 is slideably received in the second recess 7.

A rectangular opening 40 is defined in a bottom surface 401 of the first recess 4. The opening 40 is formed for exposing an electrical connector 44 mounted on a printed circuit board (not shown) of the electronic device. The electrical connector 44 comprises an insulating housing 44a and a plurality of pin contacts 44b mounted therein. An elastic element 41 attaches to the bottom surface 401 of the first recess 4, is parallel to the bottom surface 401 of the first recess 4, and is located adjacent to the rectangular opening 40. The elastic element 41 comprises a base portion 42 connecting to the bottom surface 401 of the first recess 4, a free end 45, and a projection 43 extending from the free end 45. A slot 47 at an end of the first recess 4 extends beneath a sidewall 46, which sidewall defines one side of the battery-receiving compartment 3. A slant 48 defines a bottom boundary of the slot 47. An arris 49 is formed where the slant 48 intersects the bottom surface 401 of the first recess 4.

A pair of wings 74 is formed at two sides of the second recess 7 and a plateau 72 is formed therebetween. A pair of apertures 78, 79 is defined in an end of each wing 74, arranged along a path of movement of the slideable element 5. A first positioning hole 76 and a second positioning hole 77 are defined in the plateau 72 and are also arranged along the path of movement of the slideable element 5.

The slideable element 5 is made from a thin sheet material which can be metal, plastic, or another material. A center dome 52 and a pair of side domes 53 protrude downwardly from the slideable element 5. A pair of tabs 54 extends to two opposite sides of and is integrally formed with the slideable element 5, and the tabs 54 are elastic.

To assemble the securing assembly 2, the slideable element 5 is slidingly engaged in the second recess 7, with one the tabs 54 being slidingly received beneath the wings 74 and then the other of the tabs 54 being inserted beneath the wings 74. When the slideable element 5 is moved to a latched position, the center dome 52 is received in the second positioning hole 77 and the side domes 53 are received in the apertures 79. When the slideable element 5 is moved to an unlatch position the center dome 52 is received in the first positioning hole 76 and the side domes 53 are received in the apertures 78.

Figure 2:
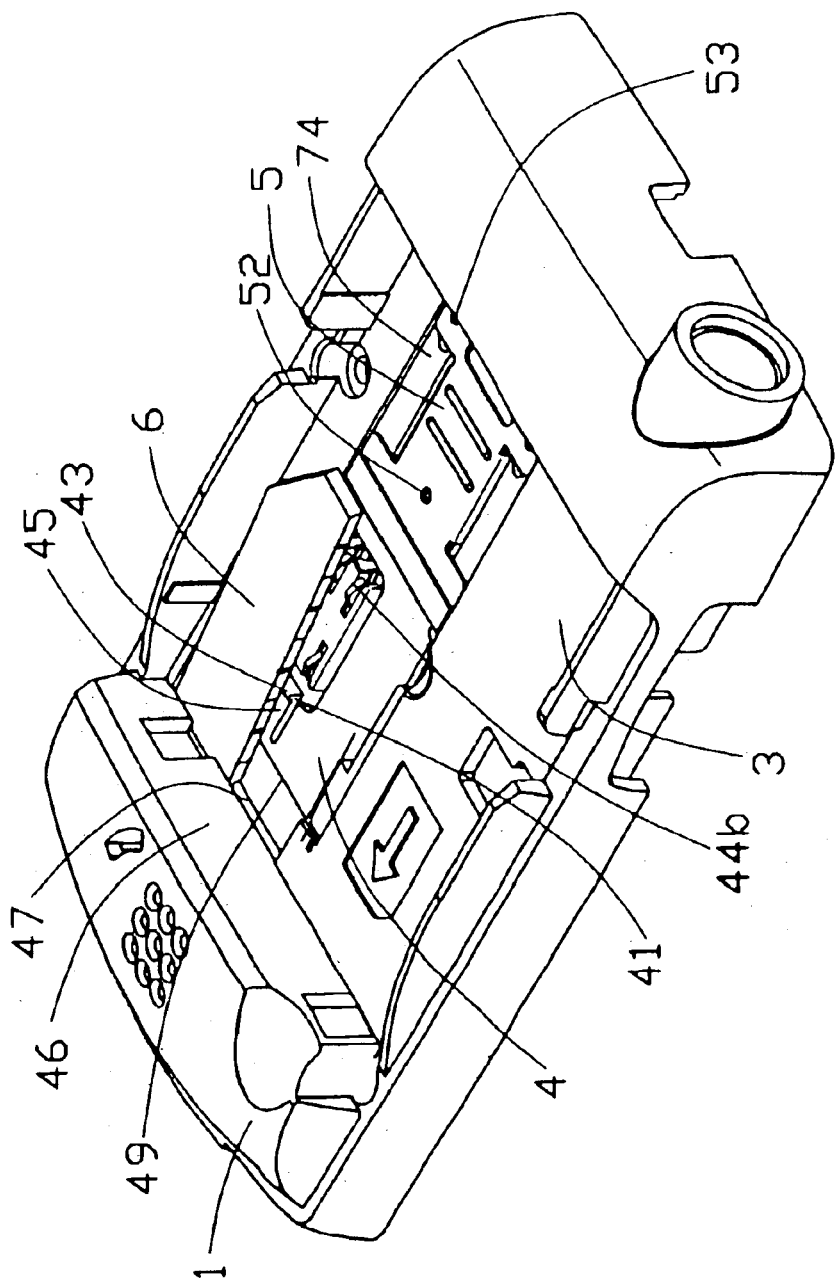
FIG. 2 is a perspective view of FIG. 1, wherein the SIM card is shown cross-sectionally in the process of being assembled in the SIM card receiving mechanism.
Figure 3:
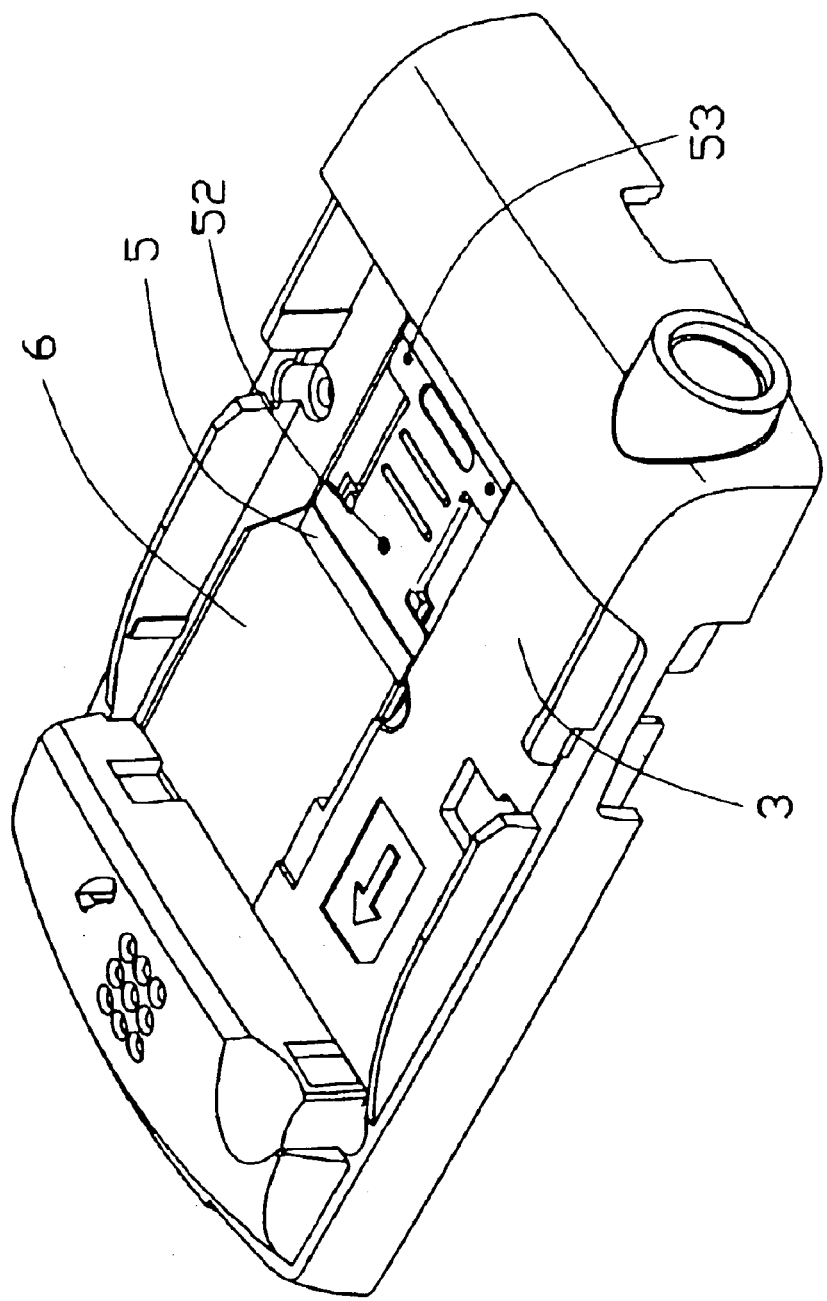
FIG. 3 is a perspective view of FIG. 2, in which the SIM card is fully assembled in the SIM card receiving mechanism.

Referring to FIG. 2, when the SIM card 6 is assembled into the electronic device, a rear end of the SIM card 6 is moved along the slant 48 and is inserted into the slot 47 of the first recess 4. Then, a front end of the SIM card 6 is pressed down to connect electrical contacts (not shown) on a bottom side (not shown) of the SIM card 6 with the pin contacts 44b of the electrical connector 44. When the SIM card 6 is completely inserted, it lies against the bottom surface 401 of the first recess 4 and holds the pin contacts 44b down. To retain the SIM card 6 in place, the slideable element 5 is pushed to the latched position so that the dome 52 of the slideable element 5 disengages from the first positioning hole 76 and moves to engage with the second positioning hole 77, while the pair of domes 53 moves from the apertures 78 to the apertures 79. The slideable element 5 thereby holds a top surface of the SIM card 6 down, securing the SIM card 6 in the first recess 4, as shown in FIG. 3.

To removed the SIM card 6, the slideable element 5 is pushed to the unlatched position so that the domes 52, 53 disengage respectively from the second positioning hole 77 and apertures 79 and slide respectively to the first positioning hole 76 and the apertures 78. When the slideable element 5 is at its unlatched position in the second recess 7, the end of the SIM card 6 which was held by the slideable element 5 rises under the action of the elastic force of the elastic element 41 and the SIM card 6 pivots about the arris 49. The SIM card 6 can then be easily removed from the first recess 4 of the battery-receiving compartment 3.

The SIM card receiving mechanism of the present invention makes it easier for consumers to change the SIM card 6 of the electronic device.

It is believed that the present invention and its advantages will be understood from the foregoing description and it will be apparent that various changes may be made thereto without departing from the spirit and scope of the invention or sacrificing all of its material advantages, the example hereinbefore described merely being a preferred or exemplary embodiment of the invention.

I claim:

1. A SIM card receiving mechanism for holding a SIM card in an electronic device, comprising:
   a receiving recess for receiving the SIM card, an opening being defined through a bottom surface of the receiving recess for mounting a SIM card connector, said SIM card connector including a plurality of electrical contacts being electrically connected to the SIM card, an elastic element being formed in the receiving recess; and
   a securing assembly being substantially adjacent to said receiving recess, comprising a slideable member to hold the SIM card down in the receiving recess;
   wherein
      the elastic element projects from a bottom surface of the receiving recess, adjacent to the opening in the receiving recess.

2. The SIM card receiving mechanism of claim 1, wherein the elastic element comprises a base portion connecting to the bottom surface of the receiving recess, a free end, and a projection extending from the free end thereof.

3. The SIM card receiving mechanism of claim 1, wherein the receiving recess is defined in a corner of a bottom surface of a battery-receiving compartment of the electronic device.

4. The SIM card receiving mechanism of claim 3, wherein a slot at an end of the receiving recess extends beneath a sidewall of the battery-receiving compartment.

5. The SIM card receiving mechanism of claim 4, wherein a slant defines a bottom boundary of the slot and an arris is formed where the slant intersects the bottom surface of the receiving recess.

6. A SIM card receiving mechanism for holding a SIM card in an electronic device, comprising:
   a first recess for receiving the SIM card therein;
   an elastic member being formed in the first recess;
   a second recess being in communication with the first recess; and
   a slideable element being slideably received in the second recess;
   wherein
      the first recess is defined in a corner of a bottom surface of a battery-receiving compartment of the electronic device, an opening is defined through the bottom surface of the first recess for mounting a SIM card connector, and the elastic element is adjacent to said opening, the slideable element is slidingly moved toward the first recess, the slideable element holds the SIM card in the first recess, when the slideable element disengages with the SIM card, the elastic element pushes the SIM card to protrude from the first recess.

7. The SIM card receiving mechanism of claim 6, wherein the elastic member projects from a bottom surface of the first recess.

8. The SIM card receiving mechanism of claim 6, wherein a slot at an end of the receiving recess extends beneath a sidewall of the battery-receiving compartment.

9. The SIM card receiving mechanism of claim 8, wherein a slant defines a bottom boundary of the slot and an arris is formed where the slant intersects the bottom surface of the first recess.

10. The SIM card receiving mechanism of claim 6, wherein a pair of wings is formed at two sides of the second recess and a plateau is formed therebetween.

11. The SIM card receiving mechanism of claim 10, wherein a first positioning hole and a second positioning hole are defined in the plateau of the second recess and are arranged along the path of movement of the slideable element.

12. The SIM card receiving mechanism of claim 10, wherein the slideable element comprises a pair of tabs extending to two opposite sides thereof and being integrally formed therewith.

13. The SIM card receiving mechanism of claim 12, wherein each said tab is slidingly received beneath each wing in the second recess.

14. An IC card receiving mechanism assembly comprising:
   a cover device;
   a plateau mounted on the cover device;
   a space exposed to an exterior after removal of a battery module from the cover device;
   an electrical connector exposed to and located under said space;

an IC card assembled unto the connector with one end inserted into a slot under a side wall which is positioned beside said connector, and the other end pressed downwardly by a securing device which is located by said connector opposite to said side wall; wherein said securing device is moveable relative to the cover device to free said other end; wherein said securing device is discrete from the cover device while horizontally slidable relative to the cover device between latched and unlatched positions, and wherein said securing device is essentially horizontally unbiased by said cover device in both said latched and unlatched positions but horizontally retained by said plateau in both latched and unlatched positions.

15. The assembly of claim 14, wherein a central portion of a top face of said IC card is exposed to said space without being hidden by said securing device and said side wall.

16. The assembly of claim 14, wherein an elastic element projects from a bottom surface of said space, adjacent to said electrical connector.

* * * * *